United States Patent [19]

Chikashige

[11] Patent Number: 4,712,147
[45] Date of Patent: Dec. 8, 1987

[54] TAPE TRANSPORT CYLINDER WITH STRESS-RELIEVED BEARING RECESS

[75] Inventor: Kiyoshi Chikashige, Tokyo, Japan

[73] Assignee: Clarion Co., Ltd., Tokyo, Japan

[21] Appl. No.: 588,520

[22] Filed: Mar. 12, 1984

[30] Foreign Application Priority Data

Mar. 16, 1983 [JP] Japan .................................. 58-42095
Mar. 17, 1983 [JP] Japan .................................. 58-43048

[51] Int. Cl.⁴ ............................................. G11B 15/60
[52] U.S. Cl. .................................. 360/130.24; 360/84
[58] Field of Search ...................... 360/85, 95, 130.24, 360/130.21–130.23, 94, 84

[56] References Cited

U.S. PATENT DOCUMENTS 3,800,314  3/1974  Sato ........................................ 360/85
4,347,536  8/1982  Miyashita et al. ......... 360/130.22 X Primary Examiner—John H. Wolff
Assistant Examiner—David J. Severin
Attorney, Agent, or Firm—Russell E. Hattis; Stephen R. Arnold

[57] ABSTRACT

The magnetic tape guiding cylinder device includes a rotatable upper cylinder; a fixed lower cylinder opposed to the upper cylinder and having a cylindrical member integrally formed with and penetrating through a bottom plate at one end of the lower cylinder which is remoter from the upper cylinder, the cylindrical member being provided with bearings at both axial end portions; a drive shaft rotatably supported by the lower cylinder via the bearings to drive the upper cylinder, the cylindrical member being grasped by a chuck during finishing operation of the lower cylinder. The device is particularly characterized in that the cylindrical member is formed with a circular groove along the outer circumference between the bottom plate and one of the axial end portions which is remoter from the upper cylinder.

4 Claims, 8 Drawing Figures

TAPE TRANSPORT CYLINDER WITH STRESS-RELIEVED BEARING RECESS

FIELD OF THE INVENTION

This invention relates to a magnetic tape guiding cylinder device in a VTR (video tape recorder), and more particularly to a device which is not liable to deformation in its important portion during the finishing operation thereof.

BACKGROUND OF THE INVENTION

One of the prior art magnetic tape guiding cylinder device is shown in FIG. 1. Reference numeral 1 designates an upper cylinder and 2 is a lower cylinder fixed to a base plate not shown by a suitable method. The lower cylinder 2 is formed along the circumferential surface thereof with a tape travel path 2a. A cylindrical member 2c is integrally formed with and penetrates through a bottom plate 2b of the lower cylinder 2. Two bearings 3 and 4 are fitted at both ends of the cylindrical member 2c. A drive shaft 5 is fixed to the upper cylinder 1. The upper cylinder 1 is rotatably supported by the lower cylinder 2 via the drive shaft 5 and the bearings 3 and 4. Magnetic heads 6a and 6b are fixed to the circumference of the upper cylinder 1. A magnetic tape T engages the tape travel path 2a and travels slightly obliquely about a half revolution of the circumference of the cylinders 1 and 2. The upper cylinder 1 rotates at a given speed responsively to the travel of the magnetic tape T in the same direction. So, if the upper cylinder 1 vibrates or deviates radially during the rotation, such vibration or deviation makes noises during recording or playback and damages the reproduced picture. Main factors causing such vibrations or deviations are inaccurate roundness of the upper cylinder 1, deviation of the rotation axle thereof, and vibration of rolling steel balls of the bearings 3 and 4. Therefore, it is important to precisely finish the upper and lower cylinders to keep an acceptable roundness of the upper cylinder 1 and of bearing mounting surfaces 2d and 2e (FIG. 2) along the inner periphery of the cylindrical member 2c.

FIG. 2 shows how to finish the lower cylinder 2. First, the outer periphery of the cylindrical member 2c is finished so as to have a sufficient smoothness. A three-way chuck 7 engages this finished outer periphery and unmovably supports the lower cylinder for succeeding finishing operations thereof. Thus, the bearing mounting surfaces 2d and 2e of the inner periphery of the cylindrical member 2c and the tape travel path 2a along the outer periphery of the lower cylinder 2 are cut and finished. For this purpose, the fastening force of the three-way chuck 7 must overcome the rotating tendency of the lower cylinder 2 produced by the cutting operation. This force will be substantially proportional to the contact area between the chuck 7 and the cylindrical member 2c, i.e. to the length L of the contacting surface of the chuck 7 and to the outer diameter of the cylindrical member 2c, or alternatively proportional to the fastening force of the chuck 7.

However, keeping a sufficiently large friction area does not meet a recent market demand of reducing the size and weight of such a video tape recorder.

To compensate an insufficient friction area, it is necessary to increase the fastening force of the chuck 7. The latter measure, however, produces another problem in the prior art. Namely, even if the chuck 7 contacts the central portion of the cylindrical member 2c, avoiding one end portion corresponding to the bearing mounting surface 2d, the directly engaged portion of the cylindrical member 2c is deformed due to a strong pressure from the chuck 7 and this deformation reaches the said end portion in question. So, even if an acceptable roundness of the bearing mounting surface 2d is created during the deformation, the roundness is distorted when the three-way chuck 7 is removed and the cylindrical member 2c recovers its original aspect. The distorted bearing mounting surface 2d distorts the roundness of an outer ring 3a of the bearing 3 as shown in FIG. 3. As a result, the steel balls 3b vibrate during their rolling movement and cause deterioration of the reproduced picture.

OBJECT OF THE INVENTION

It is therefore an object of the present invention to provide a construction of a magentic tape guiding cylinder capable of keeping the bearing mounting surface away from deformation of the cylindrical member which might be caused by a large pressure of the chuck onto the cylindrical member when the chuck forcibly grasps the lower cylinder for finishing cut thereof. This object is attained by providing a circular groove along the outer periphery of the circular member between the bearing mounting surface and the bottom plate of the lower cylinder.

SUMMARY OF THE INVENTION

In accordance with the present invention, there is provided a magnetic tape guiding cylinder device comprising:
 a rotatable upper cylinder;
 a fixed lower cylinder opposed to said upper cylinder, said lower cylinder having acylindrical member integrally formed with and extending from a bottom plate at the end of said lower cylinder which is remote from said upper cylinder, said cylindrical member being provided with bearings at both axial end portions thereof;
 a drive shaft rotatably supported by said lower cylinder via said bearings to drive said upper cylinder; and
 a circular groove formed along the outer circumference of said cylindrical member between said bottom plate and one said axial end portions of said cylindrical member which is remoter from said upper cylinder.

DETAILED DESCRIPTION OF PREFERRED EMBODIMENT

Figure 1:
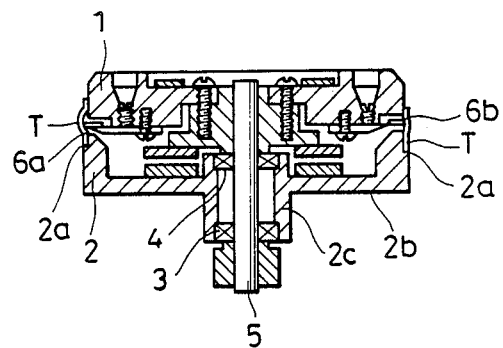
FIG. 1 is a cross-sectional view of a prior art magnetic tape guiding cylinder device.

The features of the invention will be best understood in relation to the embodiments illustrated in the drawings.

Figure 2:
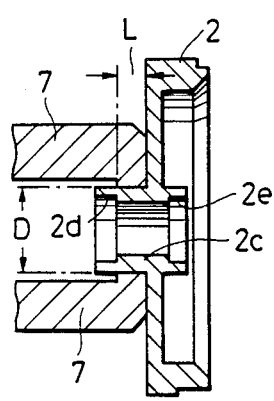
FIG. 2 is a cross-sectional view of a lower cylinder and a three-way chuck to illustrate how the three-way chuck is fitted onto the lower cylinder for finishing cut thereof.
Figure 3:
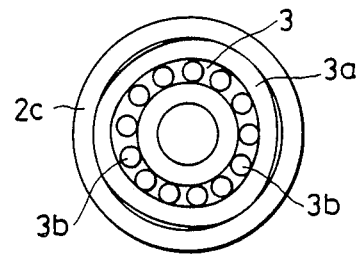
FIG. 3 is an enlarged plan view of a cylindrical member of the lower cylinder and a bearing fixed thereto to illustrate insufficient roundness of these members.
Figure 4:
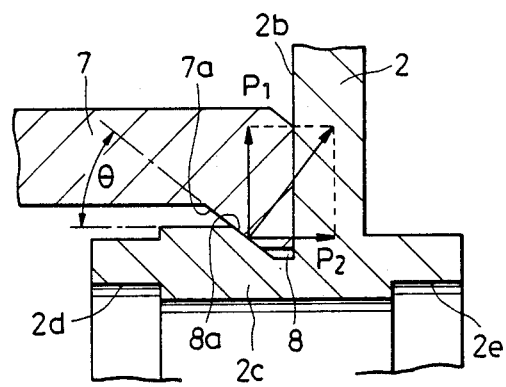
FIG. 4 is a partial, enlarged cross-sectional view of the lower cylinder employed in a device embodying the invention, with a three-way chuck being fitted for finishing cut of the lower cylinder.

FIG. 4 shows an embodiment of the invention wherein the same reference numerals as those used in FIGS. 1 and 2 designate the same or similar components or elements. The cylindrical member 2c has formed adjacent the bottom plate 2b of the lower cylinder 2 with an annular groove 8 which makes a closed loop along the outer periphery of the cylindrical member 2c. The groove 8 is defined by one side wall which is an extension of the bottom plate 2b and by a tapered side wall 8a entering into the cylindrical member 2 at an angle of $\theta$ degrees. The chuck 7 has an engagement portion with one face 7a tapered correspondingly to the tapered wall 8a so as to fittingly enter in the groove 8. When the engagement portion of the chuck 7 is forced into the groove 8, a radical pressure $P_1$ from the chuck 7 produces an axial component of pressure $P_2$ to the bottom plate 2b due to function of the tapered wall 8a. As the result, the total friction area of the chuck 7 to the lower cylinder 2 is the sum of the friction area to the tapered wall 8a and the friction area to the bottom plate 2b. Therefore a given radial force from the chuck 7 produces a remarkably larger friction force in this embodiment than the prior art of FIG. 2 wherein the friction force is merely produced by the contact of the chuck 7 to the outer periphery of the cylindrical member 2c. This means that a smaller pressure from the chuck produces a sufficient force to non-slippingly support the lower cylinder during finishing operation thereof. This contributes to an extreme reduction of deformation in the cylindrical member 2c, and accordingly to substantial elimination of deformation in the bearing mounting surface 2d. Therefore, an acceptable roundness of the bearing mounting surface 2d created by the finishing cut is maintained after the chuck 7 is removed. The properly, finished bearing mounting surface 2d properly receives the bearing 3 and does not cause vibration of the steel balls 3b nor bad influences therefrom to a reproduced picture.

Figure 5:
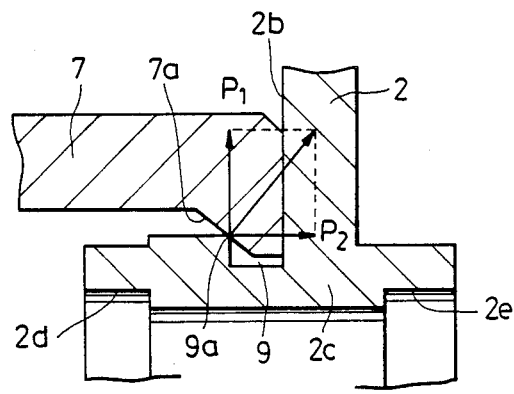
FIG. 5 is a partial, enlarged cross-sectional view of a further embodiment, with the three-way chuck being fitted also.

FIG. 5 shows a further embodiment according to the invention in which an annular groove 9 having a rectangular cross-section is formed along the outer periphery of the cylindrical member 2c. The three-way chuck 7 having the tapered face 7a is also used to grasp the lower cylinder 2 for finishing cut thereof as in the first embodiment. In this further embodiment, however, a right-angle corner 9a of the groove 9 contacts the tapered face 7a of the chuck 7 and produces an axial component pressure $P_2$ to the bottom plate 2b of the lower cylinder 2. Due to this pressure $P_2$, a friction force is produced between the bottom plate 2b of the lower cylinder 2 and the opposed face of the chuck 7, as in the first embodiment. The friction area of the tapered face 7a with the cylindrical member 2c in the second embodiment is smaller than that in the first embodiment. However, the smaller friction area can be compensated by selection of the width and the depth of the groove 9 and the inclination of the tapered face 7a of the chuck 7 so that a given radial force from the chuck 7 as small as in the first embodiment can produce a sufficient force to reliably prevent the lower cylinder 2 from rotation during the finishing cut thereof.

Figure 6:
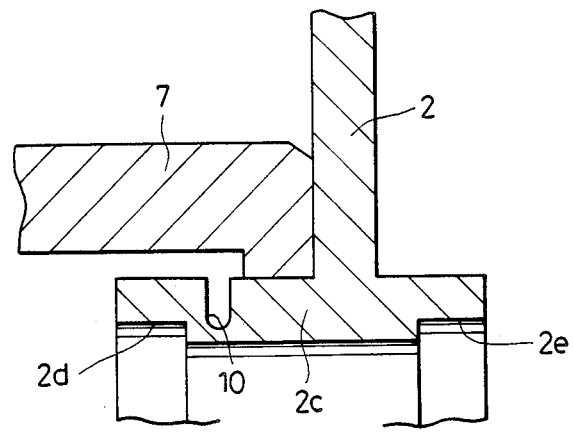
FIG. 6 is a partial, enlarged cross-sectional view of a still further embodiment, with the three-way chuck being fitted also.
Figure 7:
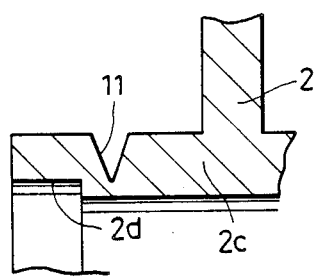
FIGS. 7 and 8 are partial, enlarged sectional views of yet further embodiments.
Figure 8:
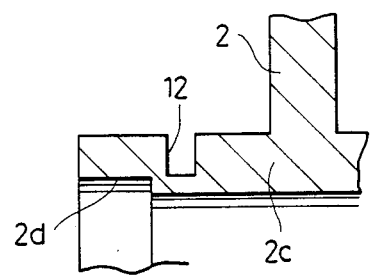

FIG. 6 shows a still further embodiment according to the invention. The cylindrical member 2c is formed with an annular groove 10 having a U-shaped cross-section along the outer periphery thereof between one end portion corresponding to the bearing mounting surface 2d and a portion neighbouring the base plate 2b on which the chuck 7 is fitted. The circular groove 10 may be replaced by a groove 11 having a U-shaped cross-section as shown in FIG. 7 or alternatively by a groove 12 having a rectangular cross-section as shown in FIG. 8, for example, provided they sufficiently cushion a deformation in the portion directly engaged by the chuck 7. If the outer diameter of the lower cylinder 2 (diameter of the tape contacting surface) is 40 mm$\phi$, the outer diameter of the cylindrical member 2c is 14 mm$\phi$, the inner diameter is 9 mm$\phi$, and the thickness of the side wall of the cylindrical member 2c at the chuck fitting portion is 3 mm, the approximate recommended width and depth of the circular groove 10 are 1 mm and 2.5 mm, respectively. Accordingly, the thickness of the cylindrical member 2c at the groove 10 becomes 0.5 mm which is thin enough to produce a sufficient buffer action against the pressure from the chuck 7 and strong enough to prevent that the end portion for the bearing mounting surface 2d is torn off during the cutting operation.

It should be noted that no groove is provided between the chuck fitting portion and the other end portion corresponding to the other bearing mounting surface 2e because the rigidity of the bottom plate 2b prevents the deformation in the chuck fitting portion from being conveyeed to the other bearing mounting surface 2e.

For finishing cut of the lower cylinder 2, the three-way chuck 7 is fitted on and non-slippingly grasps the cylindrical member 2c as shown in FIG. 6. Thus the bearing mounting surfaces 2d and 2e are formed along the inner surface of the cylindrical member 2c and the tape travel path 2a (FIG. 1) is formed along the outer periphery of the lower cylinder 2. To this end, the pressure of the chuck 7 must be sufficiently large to reliably fix the lower cylinder. This force will cause a deformation in the chuck contacting portion of the cylindrical member 2c. However, this deformation hardly reaches the bearing mounting surface 2d due to the elasticity and buffer action given by the groove 10.

As described above, according to the invention, the bearing mounting surface is not deformed by pressure from the chuck, because the annular groove on the cylindrical member is so formed that the pressure from the chuck, which is so small as not to deform the cylindrical member so much can still produce an axial pressure against the bottom plate of the lower cylinder which is large enough to non-slippingly fix the lower cylinder 2, or alternatively because the circular groove provides cushioning properties against the pressure from the chuck which deforms the cylindrical member but does not convey the deformation to the bearing mounting surface. Therefore, the roundness of the bearing mounting surface, formed in a substantially non-deformed state, is maintained also after the chuck is removed. The bearing mounting surface having such proper roundness can properly receive the bearing, and can prevent vibrations of the steel balls of the bearing and bad influences thereof to the reproduced picture. The invention also gives an additional advantage that provision of the groove reduces the weight of the lower cylinder.

The embodiments of the invention in which an exclusive property or privilege is claimed are defined as follows:

1. In a magnetic tape guiding cylinder device including: an upper cylinder adapted to receive a magnetic tape at the periphery of the cylinder, and a fixed lower cylindrical assembly, the improvement in said lower cylindrical assembly wherein it includes an outer cylindrical shell connected by a radially extending wall to an inner cylindrical tubular portion projecting axially from said radially extending wall and being coaxial with said outer cylindrical shell, said inner cylindrical tubular portion being provided with at least a first bearing recess on the interior thereof; a bearing disposed in said recess, said bearing closely fitting along substantially its entire periphery in the bearing recess; a drive shaft in said cylindrical tubular portion axially attached at one end to said upper cylinder for imparting a rotary motion thereto and rotatably supported at least by said bearing, said tubular portion having a chuck engagement groove disposed along the outer circumference of said cylindrical tubular portion and between said radially extending wall and first bearing recess at the end of said tubular portion, said groove being configured to be engageable with inwardly movable jaws of a machining holding chuck, the ends of which also engage said radially extending wall so that, upon inward pressure created by entry of said jaws into said groove, said jaws also a but said radially extending wall to produce a holding force having a radial component applied against said tubular portion and an axial component against said radially extending wall to distribute the clamping forces in both radial and axial directions to mitigate substantial distortion of said tubular portion.

2. A device as set forth in claim 1 wherein said groove has a defining wall remote from said radially extending wall which is tapered to engage a correspondingly tapered portion of said jaws.

3. The magnetic type guiding cylindrical device of claim 1 wherein said groove in said lower cylindrical assembly has one radially extending groove-defining wall remote from and extending radially outwardly away from said radially extending wall so that a radially inwardly extending end portion of each of said jaws can engage against said one radially extending groove-defining wall and another portion thereof can bear against said radially extending wall.

4. The magnetic tape guiding cylinder device of claim 1 wherein said groove in said lower cylindrical assembly is of rectangular cross-section so that if said chuck jaws have a pair of inwardly tapering jaw shoulders configured to enter said groove said jaws can engage and be forced against the groove in said tubular portion.

* * * * *